(12) United States Patent
Bernini

(10) Patent No.: US 11,413,726 B2
(45) Date of Patent: Aug. 16, 2022

(54) METHOD FOR HOLDING A WORKPIECE TO BE MACHINED

(71) Applicant: C.M.S. S.P.A., Zogno (IT)

(72) Inventor: Maurizio Bernini, Voghera (IT)

(73) Assignee: C.M.S. S.p.A.

( * ) Notice: Subject to any disclaimer, the term of this patent is extended or adjusted under 35 U.S.C. 154(b) by 186 days.

(21) Appl. No.: 16/691,701

(22) Filed: Nov. 22, 2019

(65) Prior Publication Data

US 2020/0164490 A1 May 28, 2020

(30) Foreign Application Priority Data

Nov. 23, 2018 (IT) .......................... 102018000010543

(51) Int. Cl.
*B25B 11/00* (2006.01)
*B23Q 3/08* (2006.01)
*B33Y 80/00* (2015.01)

(52) U.S. Cl.
CPC ............ *B25B 11/005* (2013.01); *B23Q 3/088* (2013.01); *B33Y 80/00* (2014.12)

(58) Field of Classification Search
CPC ..... C23C 16/458; B05C 11/00; B05C 11/005; B05C 13/00; B05C 13/02; B29C 64/40; B33Y 80/00; B25B 11/00; B25B 11/005
USPC ..... 118/500, 501, 502, 503; 269/20, 21, 900
See application file for complete search history.

(56) References Cited

U.S. PATENT DOCUMENTS

| 6,032,997 A * | 3/2000 | Elliott ................... B25B 11/005 269/21 |
| 2016/0167131 A1 * | 6/2016 | Weilhammer ........ B29C 64/153 419/53 |
| 2018/0057188 A1 * | 3/2018 | Deck ..................... B25B 11/007 |

FOREIGN PATENT DOCUMENTS

| DE | 3434329 C1 | 4/1986 |
| DE | 102006049318 A1 | 4/2008 |
| DE | 102012103028 A1 | 10/2013 |
| FR | 2707541 A1 * | 1/1995 ........... B25B 11/005 |
| FR | 2707541 A1 | 1/1995 |

OTHER PUBLICATIONS

Machine Translation FR-2707541-A1 (Year: 1995).*

* cited by examiner

*Primary Examiner* — Lee D Wilson
*Assistant Examiner* — Alberto Saenz
(74) *Attorney, Agent, or Firm* — Laubscher & Laubscher, P.C.

(57) ABSTRACT

A method for holding a workpiece to be machined including the steps of: includes manufacturing a locking jig for locking the workpiece on a support base by additive production techniques wherein the locking jig includes a wall defining a loop. Irregularities present on at least one end of the wall arrangement are eliminated to define a support surface for the workpiece to be machined. A seat is formed in at least one end of the wall for housing a seal. At least one opening is formed on the support base and connected to at least one inner space of the loop on one side and with a suction device on the other side. A vacuum is supplied through the opening and the inner space which enables the workpiece to stick to and remain stationary with respect to the support surface during machining of the workpiece.

5 Claims, 4 Drawing Sheets

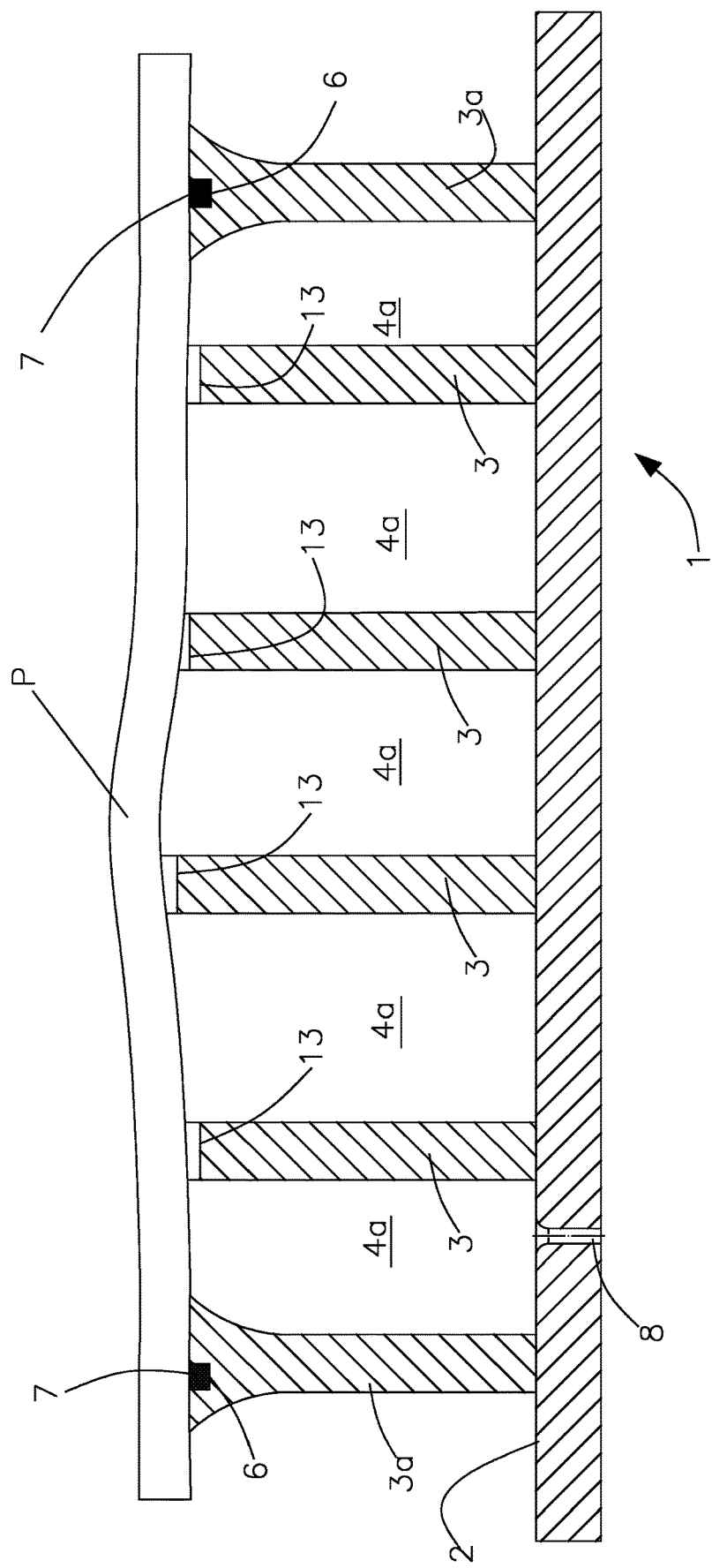

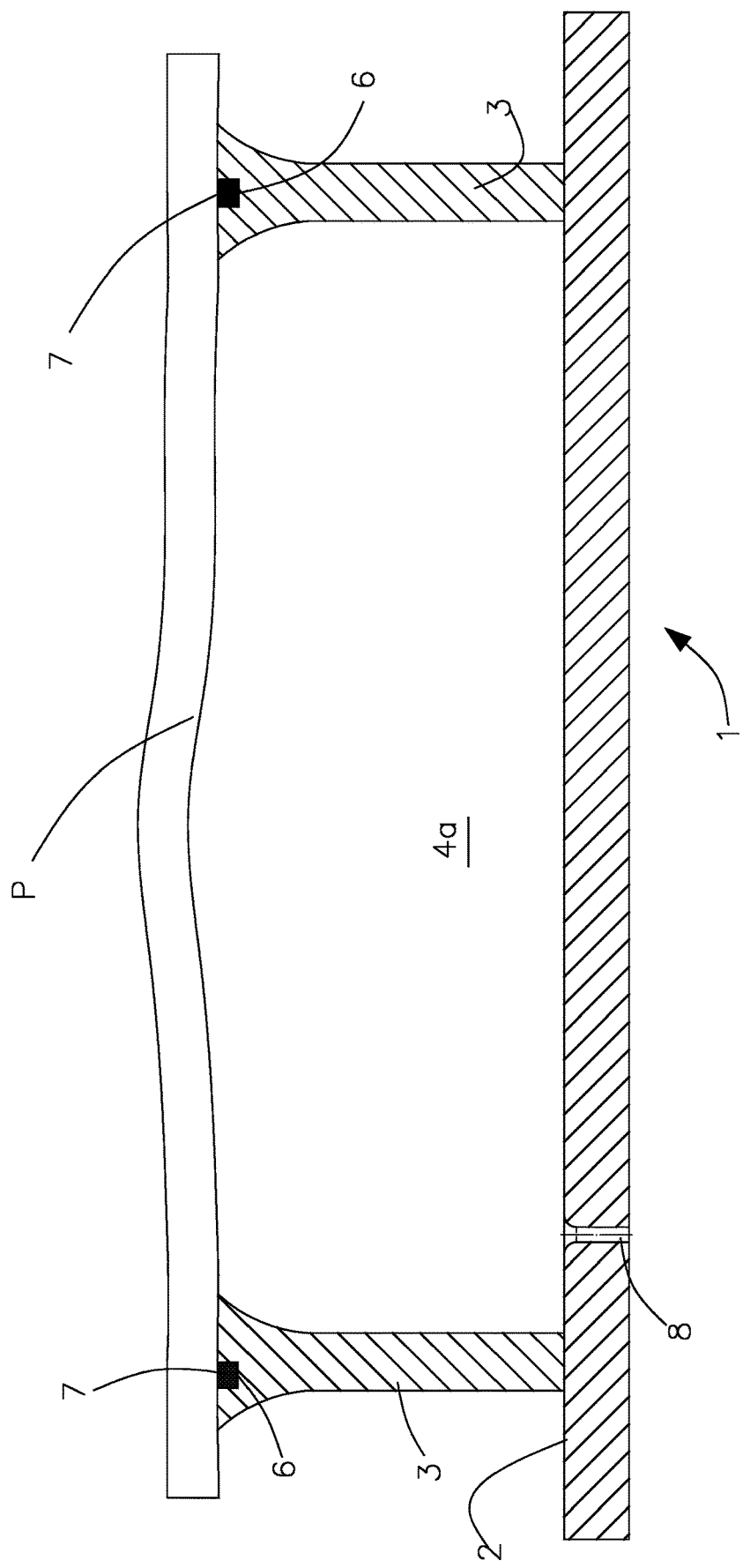

METHOD FOR HOLDING A WORKPIECE TO BE MACHINED

BACKGROUND OF THE INVENTION

The invention relates to a method for holding a workpiece to be machined.

Specifically but not exclusively, the invention can be applied to hold a workpiece that it cannot be moved in an undesirable manner during machining tasks, for example cutting tasks. The workpiece to be held may have one dimension that is substantially less than the other dimensions, for example thickness that is substantially less than width and length. The workpiece to be held may moreover have a complex shape, which is not necessarily flat, in particular a double curve.

The invention can be applied in the aerospace and/or automobile industry, to hold workpieces to be machined made of metal alloys, aluminum alloys, polymers and composites, for example car dashboards, aircraft engine casings and so on.

It is known to hold the workpiece to be machined by applying a vacuum that locks the workpiece on a rest surface of a retaining tool, known hereinafter as a locking jig.

In FIG. 1, a locking jig 101 is shown by way of example that is known to skilled persons that is used to hold a workpiece P to be machined. Making the locking jig 101 comprises a first step of superimposing a plurality of boards made of wood or an epoxy material, for example four to six boards, on a support base 102 so as to form a pile.

The step of superimposing the plurality of boards comprises in turn the step of gluing each table to the other, using for example acrylic, polyurethane, epoxy or silicone adhesive resins to form a compact block. In order to ensure complete adhesion of one board to another, it is necessary to apply pressure to the boards for sufficient time to ensure hardening of the layer of adhesive resin.

It is possible to adapt the dimensions of the locking jig 101 to those of the workpiece P to be machined, for example if the length and the width of the workpiece P are greater than the dimensions of the boards that will form the locking jig 101. In other words it is possible to cut suitably each board and/or arrange the boards against and/or on one another, as if they were parts of a puzzle and then glue the boards. These steps are usually performed manually by an operator.

Making the locking jig 101 further comprises the step of making a support surface 111 intended for holding the workpiece P to be machined, by excavating the compact block to obtain a milled block 110, for example by milling the aforesaid compact block by a numerically controlled machine tool, or manually.

Another step is to make at least one through hole 109, in particular a plurality of through holes 109, on the milled block 110.

The holes 109 are placed in fluid communication with a suction device, which is not shown, for example a vacuum pump of commercially known type. The suction device can be configured to apply a vacuum that, through the holes 109 and the further holes, enables the resting workpiece P to adhere and remain stationary with respect to the support surface 111 of the locking jig 101 during the workpiece P machining tasks.

A plurality of transmission channels 112 of the depression or the vacuum is made on the milled block 110, as shown in FIG. 1, to facilitate the transmission of the vacuum state between the holes 109 and on the entire support surface 111.

The channels 112 can be made by manual milling or even by surface incisions on the milled block 110.

On the perimeter of the milled block 110 fluid-tight seal 106 is positioned, for example a gasket, to facilitate holding of the workpiece P by the vacuum. In other words the seal prevents air entering from the exterior when the workpiece P is placed on the support surface 111 and when the suction device is driven.

This method has numerous drawbacks linked to making the locking jig. For example, the operation of gluing wooden boards to form a compact block is complicated to achieve.

Wood is a hygroscopic material, i.e. tends to absorb humidity and swell. In order to lower the humidity content, it is necessary to raise the temperature, but shrinkages of material are associated with this that minimize the thermal dilatation thereof.

In the literature, a thermal dilatation coefficient of the wood in anhydrous state is supplied according to the directions and it is known that in a preset direction the dilatation coefficient can be an order of magnitude greater than that in a direction transverse to the preset direction.

The operation of preparing the compact block can require pressure to be applied between the boards also for a long time, on the basis of the resin "curing time", i.e. the time necessary for the adhesive resin to harden.

The aforesaid method, in particular the step of making the desired shape of the locking jig by milling the full block, further results in a considerable volume of waste material, for example chips, in addition to great time and costs for performing this task.

The surfaces of the vacuum transmission channels are made by hand by the operators and are not subjected to grinding tasks; they may thus have excessively great roughness. During driving of the suction device, this causes unacceptable load losses, i.e. variations in air pressure due to friction, for example present when the air flows along the holes/channels.

The weight of a locking jig finished and made with the aforesaid method can vary between four hundred and six hundred kilograms and the total time for making the finished tool can vary between three and four weeks. The plan dimensions of the locking jig are about 4 square meters (for example two meters in length by two meters in width).

SUMMARY OF THE INVENTION

One object of the present invention is to provide a method that is able to solve one or more of the aforesaid problems of the prior art.

One object of the invention is to improve, simplify and reduce the steps of known methods for holding a workpiece to be machined.

One object of the invention is to reduce the quantity of material rejected to make the locking jig.

One advantage is reducing the time for making a locking jig suitable for holding a workpiece to be machined.

One advantage is creating the locking jig rapidly starting from a digital model.

One advantage consists of reducing load losses during the sucking and/or vacuum creation step.

Such objects and advantages of the invention are achieved by a method according to one or more of the claims set out below.

In one embodiment, it is possible to provide a method for holding a workpiece to be machined comprising the steps of manufacturing a locking jig of the workpiece on a support base by additive production techniques, the locking jig comprising a plurality of walls made to define a loop. In the context of the invention, a loop means an internally hollow substantially annular body that can be taken to be a single element of a more complex structure, known below as a lattice structure. Also in the context of the invention, a plurality of walls means a partition arrangement that can form a loop or alternatively the lattice structure. The method may comprise the following steps: eliminating possible irregularities on at least one end of the walls so as to define a support surface for the workpiece to be machined; milling the aforesaid end to make a seat intended for housing a seal; making at least one opening on the support base connected to an inner space of at least one loop of the lattice structure; connecting the at least one opening to a suction device; and applying a vacuum that, through the at least one opening and the at least one inner space, enables the workpiece to adhere and remain stationary in relation to the support surface, during machining of the workpiece.

BRIEF DESCRIPTION OF THE DRAWINGS

Further features and advantages of the invention will be clearer from the following description of a non-limiting example of an embodiment of the invention, with reference to the attached drawings, wherein:

FIG. 3 shows a section of the locking jig taken along a plane III-III with a workpiece to be machined arranged on a surface of the aforesaid jig;

FIG. 4 shows a second embodiment of the locking jig according to the invention.

Figure 1:
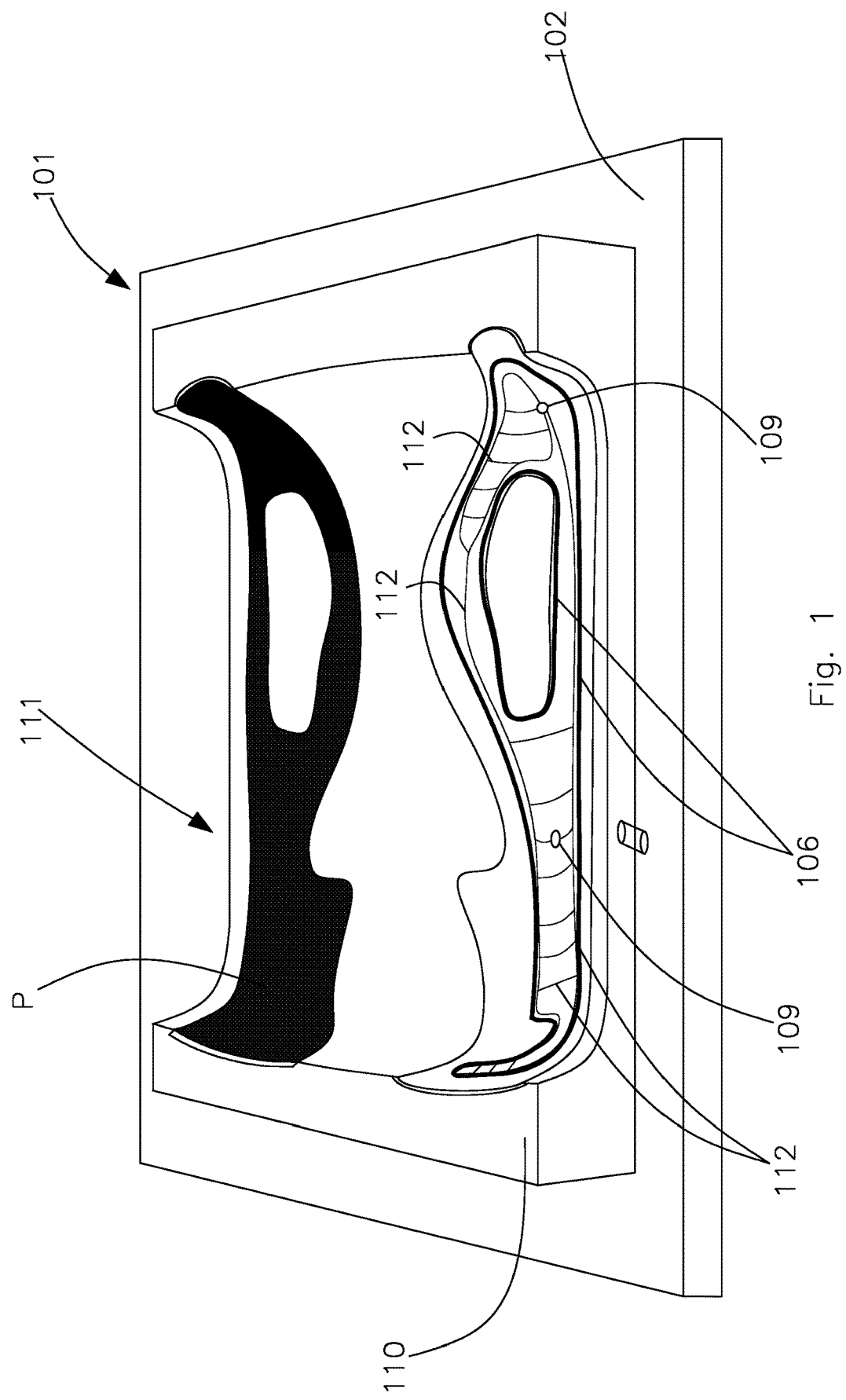
FIG. 1 is a perspective view of a locking jig known to skilled persons.

With reference to the attached figures, a method according to the invention for holding a workpiece P to be machined comprises a first step of making a locking jig 1 on which the aforesaid workpiece P to be machined is intended for resting and subsequently adhering and being held thereto.

The workpiece P to be held for being machined, for example cut, may have one dimension that is substantially less than the other dimensions, for example the thickness may be less than the width and length. The workpiece P to be held may moreover have a complex shape, which is not necessarily flat, for example may have a double curve, as shown in the section of FIG. 4.

With reference to the attached figures, an embodiment of the locking jig 1 is shown. It remains understood that the shapes of the locking jig 1 may be selected and changed according to the shapes of the workpiece P. The locking jig 1 may be made of materials like synthetic polyamides, for example nylon, or polyamides with the addition of carbon fibers.

The locking jig 1 may be manufactured by additive production techniques, for example by 3D printing. The step of manufacturing the locking jig 1 by additive production techniques comprises a first step of designing, by a computer, a digital model of the aforesaid jig 1.

The additive production techniques enable an immediate transition from the design step to the production step proper: in other words, at the end of virtual modelling of the locking jig 1, for example on a digital file of CAD ("computer-aided design") type, the aforesaid file may be sent to a 3D printer that, in a known manner, deals with production of the aforesaid locking jig 1 in complete autonomy.

The material that will define the locking jig 1, for example polyamide, is inserted in the form of granules inside a container of substantially cylindrical shape, called an extruder by skilled persons. By the combined action of preheating resistance and friction between a variable diameter screw and a fixed diameter cavity, the granules change status from solid to fluid, joining one another. The screw further conveys the required quantity to a moulding head, from which a layer of hot and continuous material exits. The moulding head may advance for a preset portion, known by the skilled persons also as a pass, into which the moulding head dispenses the material. The moulding head may advance along one or more directions that are substantially horizontal to deposit a plurality of layers of hot material next to one another, and in one or more directions that are transverse to the horizontal directions, to deposit a plurality of layers of material on one another.

The moulding speed at which the moulding head advances may be very high, for example in a range comprised between 30 and 60 meters a minute. In this manner, both simple and complex locking jigs 1 can be moulded, on the basis of the dimensions and shapes of the workpiece P to be held. The weight of the locking jig 1 made with additive technology and shown in the attached figures may vary between one hundred and one hundred and ten kilograms.

The locking jig 1 may be arranged on a support base 2 that may be made of a material like metal alloys, aluminum alloys, wood or epoxy materials. Also the support base 2 may be made by additive techniques.

The locking jig 1 may thus be manufactured directly on the support base 2, if both are made by additive production techniques.

Alternatively, if the support base 2 has already been made (also by other techniques known to skilled persons), the locking jig 1 may be made layer after layer on the support base 2, and be connected to the aforesaid base 2 by known techniques, for example by gluing. In other words a layer of adhesive resin may be deposited on the support base 2 and a first layer of polyamide material may be deposited on the aforesaid layer of resin.

The connection between the locking jig 1 and the support base 2 may also occur after the step of manufacturing the locking jig 1, i.e. the locking jig 1 may be connected to the support base 2 after the aforesaid jig 1 has been made completely.

Figure 2:
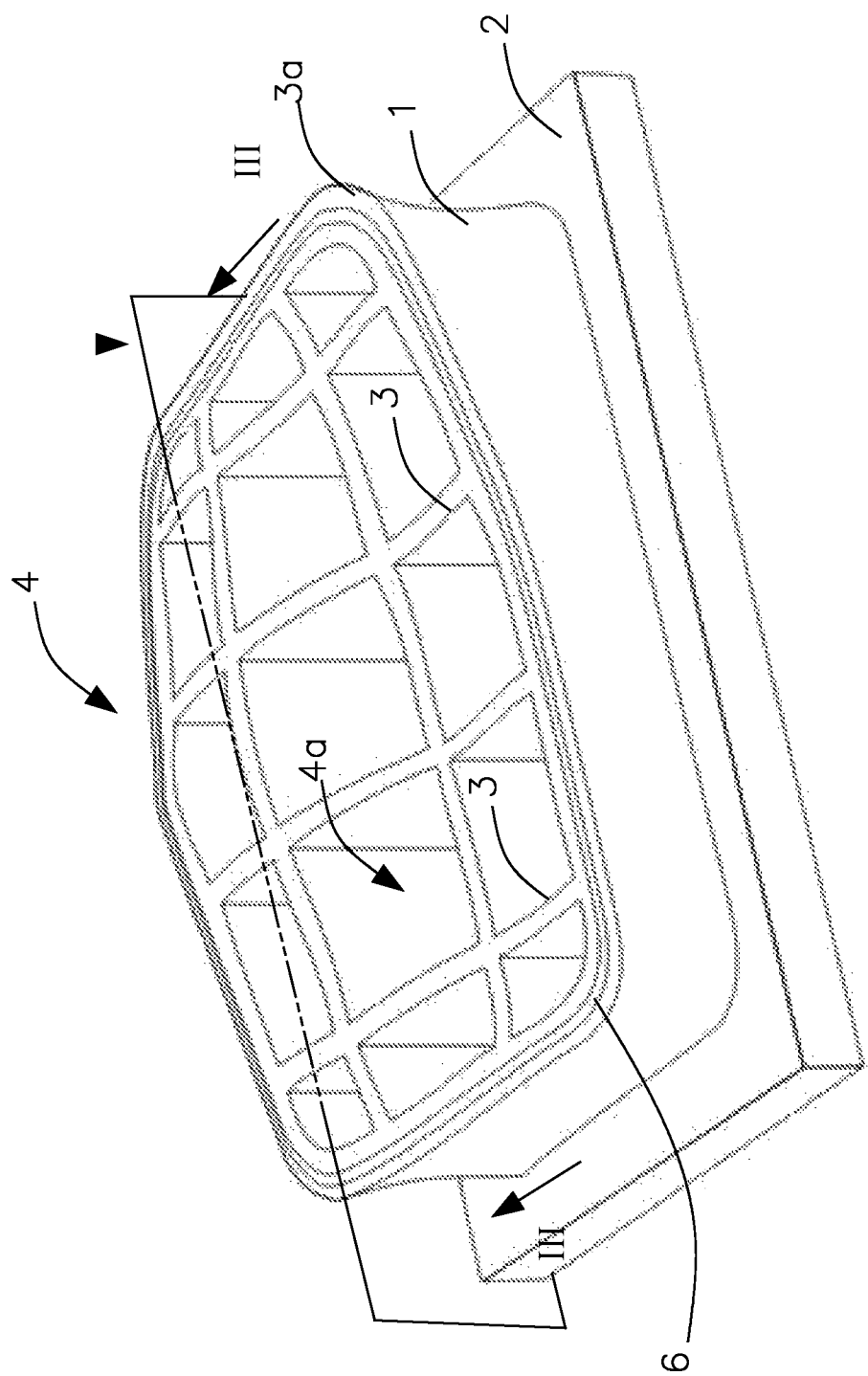
FIG. 2 is another perspective view of a locking jig according to the invention.

In the embodiment in FIG. 2, making the locking jig 1 may comprise making a plurality of walls 3 to define a plurality of loops 4a, which are in turn arranged adjacent to one another to define a lattice structure 4.

One end of each wall 3 may rest on the support base 2, the other, free, end, is intended for supporting the workpiece P to be held. The free end of each wall 3 may, in an embodiment that is not illustrated, have a thickness that is greater than the aforesaid end that rests on the support base 2. In other words, the dispensing head, in the transverse directions, in particular by moving from bottom to top, may dispense a progressively larger number of layers of material alongside one another (in the horizontal directions). In FIGS. 2 and 3 for example, the lattice structure 4 may be provided with a perimeter wall 3a with the free end that has a greater thickness than the end that rests on the support base 2.

The height of each of the walls 3 may be modified on the basis of the shape of the workpiece P to be held; the ends of each of the walls comprise a layer of material intended for being milled during a finishing step.

Each loop 4a may provide a passage 13 made on at least one of the walls 3 that defines the aforesaid loop 4a; the passage 13 enables at least two loops 4a to be placed in fluid communication. The passage 13 may be provided in an end portion of the wall 3, as shown in FIG. 3.

The passage 13 may be made simply after the step of manufacturing the walls 3 of the locking jig 1, for example by milling the end portion of the walls 3.

Alternatively, the passage 13 may be made at the same time as the step of manufacturing the walls 3 of the locking jig 1, for example by dispensing discontinuously the layer of hot material during one or more passes of the moulding head, i.e. by alternating, within the same pass, a step in which the hot material is dispensed and a step in which the hot material is not dispensed. In this manner, the wall 3 is made with the passage 13 integrated inside.

In one embodiment that is not illustrated, the passage may be made in a central or lower portion of the walls by techniques known to a skilled person, for example by inserting a solid element during the step of dispensing the layers of hot material and removing the aforesaid solid element after cooling of the aforesaid layers; or alternatively, in the wall portion where the passage will be, dispensing a second material that is intended to be then removed, for example by a chemical attack.

Another step of the method may comprise eliminating possible irregularities present on the free ends of the walls 3, for example by milling the aforesaid free ends, in this manner a (substantially smooth) support surface may be defined for the workpiece P to be machined.

Another step of the method may also comprise milling the free end of the perimeter wall 3a of the locking jig 1 to make a seat 6 intended for housing a seal 7, for example a gasket. The seal 7 prevents the air from entering from outside when the workpiece P rests on the support surface and when the suction device is driven, as will be disclosed in detail below.

It remains understood that the aforesaid seat 6 may be obtained during the dispensing step of dispensing the layers of hot material, in the manner explained previously.

Another step of the method may comprise making at least one through opening 8, on the support base 2, for example a through hole; the at least one opening 8 may be connected to at least one inner space of a respective loop 4a of the lattice structure 4.

If also the support base 2 is made by the aforesaid additive techniques, the opening 8 may also be made by dispensing discontinuously the layer of material, as explained previously. This does not exclude the possibility that a skilled person can make the at least one opening 8 in the manner that the skilled person deems to be most appropriate.

The opening 8 may be connected fluidly with suction device that is not illustrated, for example with a vacuum pump.

The suction device may apply a vacuum that, through the at least one opening 8 and the at least one space inside the loop 4a, enables the workpiece P to adhere and remain stationary with respect to the support surface of the lattice structure 4. The space inside the loop 4a thus acts as a conduit for transmitting the vacuum state from the suction device as far as the workpiece P. The inner space may have dimensions, for example width and length, which is greater than the opening 8, for example than the diameter of the through hole. Obtaining dimensions of the inner space or conduit greater than the opening 8, involved a decrease of the load losses distributed during sucking.

In the embodiment in FIGS. 2 and 3 the opening 8 may have a flare on the side in which the opening 8 is connected to the space inside the loop 4a. This enables load losses located in the space zone to be reduced that is next to the opening 8 when the vacuum state is applied, thus reducing the cost necessary for the operation of the pump.

In another embodiment, which is not illustrated, the opening on the support base may be without a flare.

The vacuum state, applied by the suction device, may be transmitted to each inner space of the lattice structure 4 via the passages 13.

In the embodiment shown in FIGS. 2 and 3, a single opening 8 is provided that is connected fluid dynamically to the suction device on one side, to an inner space of a loop 4a on the other side. Nevertheless, in one embodiment that is not illustrated a plurality of openings may be made on the support base, each opening being connected to a respective space of the loops 4a of the lattice structure 4 on one side, with the suction device on the other side.

In one embodiment shown in FIG. 2, the lattice structure 4 may comprise for example fifteen loops 4a. It is understood that the number of loops 4a may vary according to both the dimensions and the material of the workpiece P to be held during machining.

In other words, if the workpiece P to be held is, for example, made of a very deformable polymeric material, the number of loops 4a may be increased, by approaching the walls 3 and reducing the dimensions of each loop 4a accordingly. In use, when the state of vacuum is applied, a denser lattice structure, defined by loops of smaller dimensions, in fact enables deformation of the workpiece to be limited.

If the workpiece to be machined is made of a material that is not very deformable, for example of carbon fiber, the number of loops of the lattice structure may be reduced and the walls may be distant from one another.

In one embodiment illustrated in FIG. 4, the step of making the locking jig 1 on the support base 2 may comprise making a plurality of walls 3, arranged for defining a loop 4a. As disclosed previously, a loop is defined as a substantially annular body that is hollow internally that can be understood to be a single element of a more complex lattice structure.

A step may be provided of eliminating possible irregularities on one end of the walls 3 of the loop 4a so as to define a support surface for the workpiece P to be machined; possible irregularities present on the ends of the plurality of walls 3 are eliminated, for example by milling the aforesaid ends, to make a seat 6 intended for housing a seal 7; at least one opening 8 may also be made on the support base 2 so that the opening 8 is connected to at least one space inside the loop 4a. A step may thus be provided of connecting the opening 8 to a suction device and applying a vacuum state that, through the at least one opening 8 and the at least one space inside the loop 4a, enables the workpiece P to adhere to and remain stationary with respect to the support surface during machining thereof.

Owing to the invention, it is possible to make a locking jig rapidly and from nothing, starting from a digital model 3D. This enables a desired jig shape to be obtained without obtaining waste material and with significantly reduced weights.

It remains understood that multiple forms of a locking jig may be provided, which are manufacturable in markedly short time owing to additive technique technology (3D printing).

The invention claimed is:

1. A method for holding a workpiece to be processed, comprising the steps of:
   a) manufacturing a locking jig of said workpiece on a supporting base by 1) delivering a plurality of layers of hot material through displacement of a molding head to form a wall arrangement defining a lattice structure including a plurality of loops arranged adjacent to one another; and
2) forming at least one passage in at least one wall of said wall arrangement by discontinuously supplying said plurality of layers of hot material during at least one displacement of said molding head, said passage connecting at least two loops of said lattice structure;

b) eliminating any irregularities on at least one end of said wall arrangement so as to define a supporting surface for said workpiece to be machined;

c) making a seat intended for housing a seal on at least one end of said wall arrangement;

d) making at least one opening on said supporting base so that said opening is connected to at least one internal space of at least one of said plurality of loops of said lattice structure;

e) connecting said at least one opening with a suction device; and f) applying a vacuum state which, through said at least one opening, said at least one passage and said at least one internal space of at least one of said plurality of loops allows said workpiece to adhere to, and remain still with respect to, said supporting surface during its processing.

2. The method according to claim 1, wherein said step of making said seat comprises milling at least one end of said wall arrangement.

3. The method according to claim 1, wherein said step of manufacturing a locking jig on said supporting base comprises connecting said locking jig with said supporting base.

4. The method according to claim 1, wherein said step of forming at least one passage on said at least one wall of said wall arrangement comprises machining by removal of said at least one wall of said wall arrangement.

5. The method according to claim 1, wherein said passage is provided on a central portion and/or on an upper end and/or on a lower end of said wall arrangement.

\* \* \* \* \*